Feb. 1, 1944.    J. H. BOOTH ET AL    2,340,300
ADJUSTABLE LINK ASSEMBLY
Filed March 24, 1943
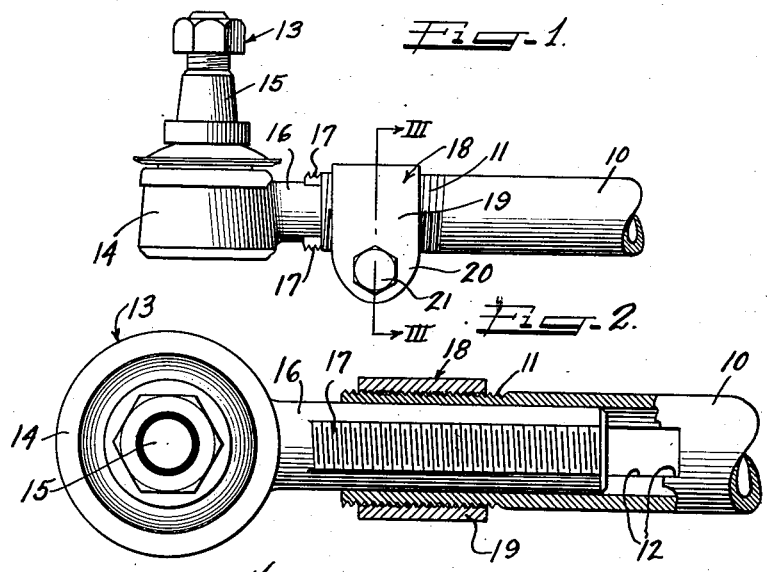
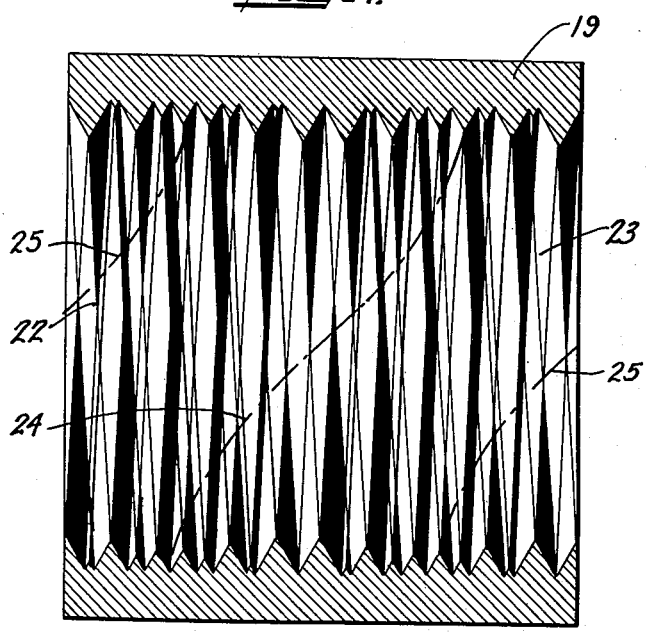
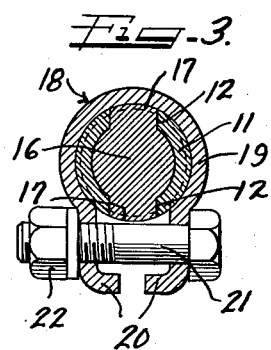
Inventors
JAMES H. BOOTH.
ANTHONY VENDITTY.
by Charles W. Hills Attys.

Patented Feb. 1, 1944

2,340,300

UNITED STATES PATENT OFFICE 2,340,300

ADJUSTABLE LINK ASSEMBLY

James H. Booth and Anthony Venditty, Detroit, Mich., assignors to Thompson Products Incorporated, Cleveland, Ohio, a corporation of Ohio Application March 24, 1943, Serial No. 480,326

7 Claims. (Cl. 287—117)

This invention relates to a link assembly composed of telescoped parts wherein the telescoped relation of the parts is varied as desired by means of a sleeve threaded onto the outermost part.

Specifically, the invention relates to an adjustable tie rod and tie rod end assembly wherein an externally threaded hollow tie rod has opposed longitudinal slots and receives the shank or stem of a tie rod end having threaded keys projecting through the slots for threaded engagement with a clamp threaded onto the rod.

While the invention will be hereinafter specifically described as embodied in a tie rod end assembly it should be understood that the invention is not limited to such an embodiment since it is generally applicable to adjustable linkages.

In accordance with this invention, a hollow tie rod having a threaded end with diametrically opposed slots extending inwardly from said end receives the shank of a tie rod end. This shank has raised lug portions or keys fitting into the tie rod slots. The key and slot arrangement prevents rotation of the tie rod shank in the tie rod.

The top surfaces of the keys are threaded in a direction opposite to the direction of the threads on the tie rod. A clamping sleeve embraces the tie rod and is provided with opposite internal threads. One set of the sleeve threads engage the threads of the tie rod while the opposite set of the sleeve threads engage the threads of the shank keys. Rotation of the sleeve on the tie rod will thus effect movement of the tie rod end in a direction either further into or out of the tie rod. The sleeve is preferably in the form of a split clamp adapted to be contracted into tight gripping engagement with the tie rod for contracting the slotted tie rod tightly against the tie rod end shank thereby holding all parts in fixed adjusted relation.

The opposite threads in the sleeve preferably have different leads so that the cross-over portions thereof are not in longitudinal alignment. When opposite threads of the same leads are tapped into a sleeve, the cross-over portions of the threads are in longitudinal alignment and the sleeve thus has an aligned mutilated portion with no threads therein capable of a rather narrow inserted male member. To prevent the formation of such aligned mutilated portions in the sleeve or clamp, it is preferred to tap the sleeve or clamp with a thread, for example a right hand thread having about eighteen threads to the inch starting from one end of the sleeve and continuing through to the other end of the sleeve. A second tap with, for example, about sixteen threads to the inch, is then run through the sleeve in the reverse direction to produce, for example, a left-hand thread. The resulting sleeve has reverse threads of two different leads therein and the cross-overs or mutilated portions of the threads will lie on a helical path in the sleeve instead of in straight longitudinal alignment therein.

It is, then, an object of this invention to provide an adjustable link including telescoped members movable in opposite directions by means of an internally threaded sleeve on the outer member.

A further object of the invention is to provide a link assembly including an externally threaded housing having a slot along the threaded portion thereof together with a member inserted in the housing having a lug seated in said slot and threaded in the opposite direction to the threads of the housing whereby a reversely internally threaded sleeve on the housing can be rotated to effect longitudinal movement between the housing and the inserted member.

A further object of the invention is to provide a tie rod, and tie rod end assembly capable of being accurately adjusted through an internally threaded sleeve on the tie rod.

A still further object of the invention is to provide a tie rod end and tie rod assembly wherein the tie rod end is externally threaded in one direction and has diametrically opposed slots extending longitudinally along the threaded portion thereof to receive externally oppositely threaded keys on the tie rod end shank with a clamp assembly having reverse internal threads engaging the key threads and the tie rod threads to effect longitudinal adjustment of the tie rod end relative to the tie rod.

A still further object of the invention is to provide a tie rod clamp having reversed internal threads for longitudinally adjusting a tie rod end in a tie rod.

A still further object of the invention is to provide a tie rod end having a cylindrical shank and an upstanding lug along the length thereof for seating in a slotted tie rod.

A still further object of this invention is to provide an adjustable link assembly equipped with telescoped, reversely threaded elements for threaded engagement with reverse internal threads in an enveloping sleeve.

Other and further objects of the invention will be apparent to those skilled in the art from the following detailed descriptions of the annexed sheet of drawing which, by way of preferred example only, illustrates one embodiment of the invention.

On the drawing:

Figure 1 is a fragmentary side elevational view of a tie rod and tie rod end assembly according to this invention.

Figure 2 is an enlarged top plan view, with parts broken away and shown in horizontal cross section, of the assembly of Figure 1.

Figure 3 is a vertical cross-sectional view, taken along the line III—III of Figure 1.

Figure 4 is a greatly enlarged longitudinal cross-sectional view of the clamp member on the assembly of Figures 1 to 3.

As shown on the drawing:

In Figures 1 and 2, the reference numeral 10 designates a hollow tubular tie rod having an externally threaded end 11. The threaded end 11, as shown in Figures 2 and 3, has diametrically opposed slots 12—12 extending inwardly from the free end of the rod. These slots 12—12 are preferably formed in the top and bottom of the rod.

The slots 12—12 can readily be formed by a vertical saw passed through the end portion of the rod.

A tie rod end 13 including a housing or socket 14 carrying in tiltable and rotatable relation, a stud 15 for attachment to a steering arm, has a rod-like solid shank or stem 16 projecting laterally from the housing 14 into the rod 10. This shank 16 has longitudinally extending upstanding lugs or keys 17—17 thereon fitting the slots 12—12. The tops of the keys or lugs 17—17 are externally threaded with the same threads but these threads extend in the reverse direction relative to the threads on the threaded end 11 of the tie rod 10. Thus if the threads of the threaded end 11 of the tie rod 10 are right-hand threads, the threads on the lugs 17—17 will be left-hand threads.

As best shown in Figure 3 the threaded tops of the lugs 17—17 are substantially flush with the top of the threaded end 11 of the tie rod.

A split clamp 18 has an internally threaded cylindrical sleeve portion 19 surrounding the threaded end 11 of the rod 10 and the lugs 17—17. Apertured ears 20—20 depend in spaced opposed relation from the cylindrical portion 19 of the clamp 18 and receive a bolt 21 therethrough. A nut 22 is threaded onto this bolt to draw the ears toward each other and thereby contract the cylindrical portion 19 of the clamp around the tie rod causing the slotted end of the tie rod to contract into tight gripping engagement with the shank 16 of the tie rod end.

As shown in Figure 4, the cylindrical portion 19 of the clamp 18 is internally threaded with reversed threads. Thus, a right-hand thread 22 having, for example, eighteen threads to the inch, is tapped through the cylindrical portion 19 from the left-hand end thereof while a left-hand thread 23 having, for example, sixteen threads to the inch, is tapped through from the right-hand end of the sleeve. This gives reversed threads of two different leads and prevents the formation of a longitudinally aligned cross-over groove where the threads mutilate each other. Instead, the cross-over points occur on two helical paths indicated by the lines 24 and 25. The path 25 is shown in two lines but it will be understood that the illustrated view is a half section and the two lines 25 connect in the other half section (not shown) to form a full helix. The keys 17—17 of the tie rod end shank 16 will always engage their corresponding thread in the cylindrical portion of the clamp. Since these keys or lugs may be relatively narrow, the use of reversed threads having the same lead might result in the positioning of a mutilated thread portion along a key resulting in a very weak thread connection. The helical paths of the mutilated thread areas, however, prevents such a weak connection because some good threads must always engage the keys.

If the keys 17—17 are provided with right-hand threads, they will engage the thread 22 of the clamp. In such installations the thread on the end 11 of the rod 10 will be a left-hand thread for engaging the left-hand thread 23 of the clamp.

Rotation of the clamp 18 on the threaded end 11 of the rod in a direction to advance the clamp toward the free end of the rod will effect a drawing-in of the shank 16 into the rod because of the reversed thread connection between the clamp and the threaded keys 17 of the shank. If the reverse threads have the same lead, one full turn of the clamp 18 on the threaded end 11 of the rod 10 in one direction will move the shank 16 in the opposite direction an amount equal to the amount of longitudinal movement of the clamp. If the reverse threads have different leads, one full turn of the clamp will result in more or less movement of the shank 16 in the reverse direction, depending upon whether or not the shank engaging thread has a greater or less lead.

As explained above, it is preferred to have the reverse threads of different leads such as, for example, a sixteen thread per inch lead on one thread and an eighteen thread per inch lead on the other thread, so that the cross-over points of the threads will not fall along diametrically opposed longitudinal paths in the sleeve portion 19 of the clamp making possible a gripping of the keys on mutilated thread areas only.

The keys 17—17 are slightly narrower than the slots 12—12 so that the slotted end of the tie rod can be clamped tightly against the shank 16 to prevent movement of this shank. At the same time the clearance between the keys in the slots when the clamp is loosened facilitates adjustment of the tie rod end.

From the above description it will be understood that the invention provides a tie rod assembly wherein a tie rod end is adjusted toward and away from the tie rod by means of a clamp having reversed internal threads one set of which engage the tie rod end and the other set of which engage the tie rod.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. An adjustable link assembly comprising an externally threaded housing having a slot therethrough extending longitudinally along the threaded portion thereof, a member seated in the housing having an externally threaded lug in said slot, the thread on said housing and the thread on said lug being reversed, and a sleeve on said housing having reversed threads mating respectively with the housing thread and the lug thread.

2. An adjustable link assembly comprising an externally threaded housing having opposed slots therethrough extending longitudinally along the threaded portion thereof, a member seated in said housing having raised externally threaded key portions in the housing slots to hold the member against rotation in the housing, and a sleeve on the threaded portion of said housing, said housing thread and said key thread being reversed, and said sleeve having internal reversed threads mating respectively with the housing thread and the key thread.

3. An adjustable link assembly comprising a tube having a hollow end portion with a longitudinal slot extending inwardly from the free end thereof, a rod slidably seated in the hollow end portion of said tube having a raised key portion extending through said slot to hold the assembly in non-rotatable relation, said hollow end portion of the tube having a thread extending inwardly from the free end thereof, said key having a thread on the outer face thereof extending in a direction reverse to the direction of the tube thread, and a sleeve having reversed internal threads mating respectively with the tube thread and the key thread.

4. An adjustable link assembly comprising a female member having an externally threaded portion and a slot therethrough extending longitudinally along said threaded portion, a male member in said female member having a raised externally threaded lug seated in said slot, a split sleeve on the female member having reversed threads therein with one thread engaging the threads on the female member and the other thread engaging the threads on the lug of the male member, and means for contracting said sleeve to clamp the female member onto the male member for holding the members in fixed relation.

5. A tie rod and tie rod end assembly comprising a tie rod having a hollow end portion with an external thread therearound and a longitudinally extending slot therethrough, a tie rod end having a shank in the hollow end portion of the tie rod, a raised externally threaded lug on said shank seated in said slot, a clamp on said tie rod having reversed threads therein with one thread engaging the tie rod thread and the other thread engaging the lug thread, and means for contracting said clamp on the tie rod to contract the tie rod into tight engagement with the tie rod end shank.

6. A tie rod and tie rod end assembly comprising a tie rod having a hollow externally threaded end portion with diametrically opposed longitudinally extending slots therein, a tie rod having a shank seated in the hollow tie rod end, said shank having raised externally threaded keys seated in said slots of the tie rod, a clamp on said tie rod having reversed threads therein with one set of threads engaging the tie rod threads and the other set engaging the key threads, and a nut and bolt assembly on said clamp for contracting the same to compress the tie rod onto the tie rod end shank for holding the assembly in fixed relation, said nut and bolt assembly being adjustable on said clamp to permit rotation of the clamp on the tie rod for moving the tie rod end shank into and out of the tie rod.

7. A tie rod and tie rod end assembly comprising a hollow tie rod having external threads around the end portion thereof and diametrically opposed longitudinal slots extending inwardly from said ends, a tie rod end having a stem projecting into said tie rod, said stem having externally threaded raised key portions seated in said slots of the tie rod, said key portions being narrower than the free widths of said slots, said threads on the tie rod extending in one direction, said threads on the keys extending in the opposite direction and having a different lead than the tie rod threads, and a split clamp assembly on said tie rod having internal reversed threads mating respectively with the tie rod threads and the key threads for moving the tie rod stem into and out of the tie rod, said clamp being contractible on the tie rod to decrease the width of said slots and clamp the tie rod tightly on the stem for holding the assembly in fixed relation.

JAMES H. BOOTH.
ANTHONY VENDITTY.